United States Patent [19]
Whaley et al.

[11] Patent Number: 6,088,701
[45] Date of Patent: Jul. 11, 2000

[54] COMMAND DATA TRANSPORT TO A GRAPHICS PROCESSING DEVICE FROM A CPU PERFORMING WRITE REORDERING OPERATIONS

[75] Inventors: Kenneth M. Whaley, Cupertino, Calif.; Gary Tarolli, Concord, Mass.

[73] Assignee: 3Dfx Interactive, Incorporated, San Jose, Calif.

[21] Appl. No.: 08/970,567

[22] Filed: Nov. 14, 1997

[51] Int. Cl.⁷ .................................................. G06F 17/30
[52] U.S. Cl. ......................... 707/102; 345/418; 345/501; 345/515; 345/522
[58] Field of Search ................................ 345/505, 522, 345/507, 509, 515, 516; 395/200.13, 380; 707/100, 102, 7; 708/200, 405; 370/445; 364/222.9

[56] References Cited

U.S. PATENT DOCUMENTS

| | | | |
|---|---|---|---|
| 3,611,316 | 10/1971 | Woodrum | 707/7 |
| 3,731,284 | 5/1973 | Thies | 708/200 |
| 4,499,555 | 2/1985 | Huang | 707/7 |
| 4,570,217 | 2/1986 | Allen et al. | 700/83 |
| 5,301,287 | 4/1994 | Herrell et al. | 395/400 |
| 5,315,698 | 5/1994 | Case et al. | 345/522 |
| 5,321,810 | 6/1994 | Case et al. | 345/515 |
| 5,375,198 | 12/1994 | Guttag et al. | 395/157 |
| 5,416,897 | 5/1995 | Albers et al. | 395/143 |
| 5,649,173 | 7/1997 | Lentz | 395/513 |
| 5,671,406 | 9/1997 | Lubbers et al. | 707/7 |
| 5,696,924 | 12/1997 | Robertson et al. | 711/202 |
| 5,732,094 | 3/1998 | Petersen et al. | 370/445 |
| 5,748,863 | 5/1998 | Fossum | 395/122 |
| 5,761,501 | 6/1998 | Lubbers et al. | 707/100 |
| 5,777,629 | 7/1998 | Baldwin | 345/506 |
| 5,796,413 | 8/1998 | Shipp et al. | 345/522 |
| 5,831,640 | 11/1998 | Wang et al. | 345/521 |
| 5,835,096 | 11/1998 | Baldwin | 345/430 |
| 5,838,334 | 11/1998 | Dye | 345/503 |
| 5,940,090 | 8/1999 | Wilde | 345/418 |

Primary Examiner—Hosain T. Alam
Assistant Examiner—Ella Colbert
Attorney, Agent, or Firm—Fenwick & West LLP

[57] ABSTRACT

A system and method for enabling a graphics processor to operate with a CPU that reorders write instructions without requiring expensive hardware and which does not significantly reduce the performance of the driver operating on the CPU. The invention allows the graphics processor to evaluate the data sent to it by software running on the CPU in its intended and proper order, even if the CPU transmits the data to the graphics processor in an order different from that generated by the software. The invention works regardless of the particular write reordering technique used by the CPU, and is a very low-cost addition to the graphics processor, requiring only a few registers and a small state machine. The invention identifies the number of "holes" in the reordered write instructions and when the number of holes becomes zero a set of received data is made available for execution by the graphics processor.

37 Claims, 6 Drawing Sheets

| Order of Data Received | Register Address |
|:---:|:---:|
| 3 | B |
| 2 | B+1 |
| 1 | B+2 |
| 4 | B+3 |
| 8 | B+4 |
| 9 | B+5 |
| 10 | B+6 |
| 5 | B+7 |
| 7 | B+8 |
| 6 | B+9 |

Figure 5

| Time | Address | A-min | A-max | Holes | Depth-Inc |
|---|---|---|---|---|---|
| (a) | -- | B-1 | B-1 | 0 | 0 |
| (b) | B+2 | B-1 | B+2 | 2 | -- |
| (c) | B+1 | B-1 | B+2 | 1 | -- |
| (d) | B | B-1 | B+2 | 0 | -- |
| (e) | -- | B+2 | B+2 | 0 | 3 |
| (f) | B+3 | B+2 | B+2 | 0 | -- |
| (g) | -- | B+3 | B+3 | 0 | 1 |
| (h) | B+7 | B+3 | B+7 | 3 | -- |
| (i) | B+9 | B+3 | B+9 | 4 | -- |
| (j) | B+8 | B+3 | B+9 | 3 | -- |
| (k) | B+4 | B+3 | B+9 | 2 | -- |
| (l) | B+5 | B+3 | B+9 | 1 | -- |
| (m) | B+6 | B+3 | B+9 | 0 | -- |
| (n) | -- | B+9 | B+9 | 0 | 6 |
| (o) | B+1 | B-1 | B+1 | 1 | -- |
| (p) | B | B-1 | B+1 | 0 | -- |
| (q) | -- | B+1 | B+1 | 0 | 1 |

Figure 6

COMMAND DATA TRANSPORT TO A GRAPHICS PROCESSING DEVICE FROM A CPU PERFORMING WRITE REORDERING OPERATIONS

BACKGROUND OF THE INVENTION

1. Field of the Invention

The present invention relates generally to the field of computer graphics processing, and more particularly to the field of computer graphics command transport.

2. Description of Background Art

Recent advances in computer performance have enabled graphics systems to provide more realistic graphical images using personal computers and home video game computers. Such computers include a central processing unit (CPU), memory, and graphics processors. Application programs—such as games, CAD packages, and visualization systems, for example—are executed by the CPU with the graphics processors through special software referred to commonly as "device drivers" (or "drivers") to direct the graphics processor to perform specific functions. The driver translates the application's abstract notion of a device function—such as drawing a shape, e.g., a triangle, on the screen at a particular location with particular attributes such as color and texture—into a sequence of words and stores these words from the CPU to the device over a data bus. These words are frequently sent over the data bus as a sequence of (address, data) pairs where the address indicates which device (and possibly a particular location inside of the device) the data is intended for. When the words that form a complete command have been received by the device, the device carries out (or "executes") the corresponding function. There are many different ways for drivers to transmit and for devices to accept (address, data) pairs representing commands and/or data—complex devices such as three-dimensional (3D) graphics subsystems implement commands that require more than a single word of data to describe. For example, a 3D graphics device could implement a triangle rendering command that includes sending the following sequence of words:

| Address | Data |
| --- | --- |
| A0 | Draw Triangle command (DT) |
| A1 | X coordinate of vertex #1 (X1) |
| A2 | Y coordinate of vertex #1 (Y1) |
| A3 | X coordinate of vertex #2 (X2) |
| A4 | Y coordinate of vertex #2 (Y2) |
| A5 | X coordinate of vertex #3 (X3) |
| A6 | Y coordinate of vertex #3 (Y3) |

For the graphics processor (GP), e.g., the graphics engine, to correctly execute this function, it must first recognize the (A0, DT) word. This word instructs the graphics processor to execute a draw triangle function, by using the three pairs of (X,Y) data words sent via addresses A1 through A6. The graphics processor must provide some way for the vertex data to be correctly interpreted—e.g., the graphics processor must not mistakenly use Y2 for the value of the first vertex's X coordinate even if out-of-order writes from the CPU 102 delivers Y2 ahead of either X1 or X2.

The particular address values used in the (address, data) pairs accepted by the graphics processor, together with the method that the driver transmits these (address, data) pairs to the graphics processor is one example of the command and data transport method of the graphics processor. Graphics processors typically use 1 of 2 different transport methods.

The first method is the fixed addresses/hidden buffer method. In this method of transport, data is sent to one of potentially multiple different addresses, depending on how the graphics processor is meant to interpret the data. For the above example, the graphics processor would have unique addresses assigned to each of the first vertex's x coordinate (V1X), the first vertex's y coordinate (V1Y), the second vertex's x coordinate (V2X), the second vertex's y coordinate (V2Y), the third vertex's x coordinate (V3X), the third vertex's y coordinate (V3Y), and a "command" address (CMD). These separate words of memory that are used for unique purposes are stored on a graphics processor in memory words called "registers." When the graphics processor receives a word in the command register whose data value indicates the draw triangle function, it immediately executes a draw triangle function using the data values already contained in the (V1X, V1Y, . . . , V3Y) registers. Thus, in the above example, the order that the graphics processor receives the vertex words is unimportant, however, they must all be received before the command word, because the graphics processor will only use the values present in the vertex registers at the time the command word is received. For increased performance between CPU and graphics processor, the graphics processor may buffer the (address, data) pairs, e.g., a first-in-first-out buffer, so that the graphics processor can simultaneously accept new commands from the CPU while executing a drawing command. Typically, this buffer is not directly accessible by the CPU.

The second method is the no fixed addresses/exposed buffer method. In this method, unlike the first method, no fixed addresses are used. For increased performance, the first method uses a memory buffer to buffer the commands, which allows the CPU to queue new commands into the front of the buffer while the graphics processor is simultaneously reading and processing commands from the back of the buffer. In the exposed memory buffer method, the entire buffer (that was hidden from direct CPU access in the first method) can be written to directly by the CPU. This buffer begins at some address A, and continues with addresses A+1, A+2, . . . , A+N−1, where "N" is the size in words of the buffer. The graphics processor interprets words in increasing order of address, reading each new command from the buffer address following the last word of the previous command. For example, if the previous command ended at address B, the graphics processor reads the words describing the next command starting at address B+1. Since the graphics processor may implement commands of differing word sizes, any given command could begin anywhere in the buffer. When the graphics processor reads the last word in the buffer, the graphics processor starts reading from the beginning of the buffer again. For example, when address A+N is reached, the next address the graphics processor reads from is A, then A+1, A+2, etc. Thus, in the above example, the driver would transmit and the graphics processor would interpret the (address, data) pairs like this: (B, DT), (B+1, X1), (B+2, Y1), (B+3, X2), (B+4, Y2), (B+5, X3), (B+6, Y3), where B−1 was the address of the last word of the previous command. The graphics processor uses the first word (or words) of the command (B, DT) to determine the number and interpretation of the words that follow that make up the data for the command. Typically, the CPU writes all of the words describing a command to the buffer, then directs the graphics processor to execute that command.

Both of these transport methods work reasonably well on CPUs that do not perform write reordering. On CPUs that do perform write reordering, however, both methods encounter problems. Some CPUs, e.g., the Pentium Pro Processor that is commercially available from Intel Corp., Santa Clara, Calif., use write reordering. A description of write reordering is now set forth.

In the course of running a software application program, the software running on the CPU issues instructions for the CPU to read and write data to various addresses in memory. These memory access instructions are issued in a particular order by the software, and on CPUs with no reordering these instructions are carried out in order. For example, if an application program issues these memory accesses (in top to bottom order):

write "1" to address A write "2" to address B then the CPU will first store the value "1" to address A, and then will store the value "2" to address B. However, some CPUs allow a range or ranges of memory to be marked such that writes to addresses within that range issued from the application may actually occur in the memory system in an order different from that issued by software. For example, the Intel Pentium Pro and Pentium II CPUs offer the ability to mark a range of addresses as "USWC" (Uncached Speculative Write Combine). Stores to memory addresses marked USWC occur in an undefined order. In the above example, this type of CPU could either store to address A then address B, or first to address B and then to address A. Without taking extra measures to prevent this reordering, as described below, the CPU offers the application software no guarantee on what order the writes will actually occur in. By rearranging the order of writes to memory, the CPU can optimize memory performance by issuing the writes to memory such that they will occur in the least amount of time. Normally such write reordering by the CPU is not a problem for software that writes to regular system RAM, but this causes significant problems on driver software storing commands to a graphics processor.

For example, the draw triangle command, described above, which is issued using the first transport method may not operate properly if the memory writes are performed out of order. For example, in the first transport method the driver sends all of the vertex data to the vertex coordinate addresses, followed by a write to the command address to start the graphics processor processing the triangle command. If the CPU reorders this sequence of writes to store to the graphics processor's command address before any of the stores to the graphics processor's vertex data addresses, the graphics processor will process the draw triangle command using partially (or totally, depending upon how the CPU reordered the writes) incorrect vertex data, thus producing an incorrect image.

Similarly, in the second transport method, the driver sends the draw triangle command word first, followed by the vertex data, to successive addresses in the command buffer, followed by a write to a "begin processing" address that tells the graphics processor that a new command is available at the next location in the command buffer. If the write to the graphics processor's "begin processing" address is reordered by the CPU to occur before any of the other words are written to the command buffer, the graphics processor will immediately begin reading and processing the values contained in the command buffer. Since the CPU has not yet written some or all of the actual command and data words for the draw triangle command before the graphics processor begins processing the command, the graphics processor will read and process "old" values that had been previously stored at those command buffer addresses on the previous pass through the command buffer. Even worse, if the graphics processor reads and processes an "old" data word that does not represent a legal graphics processor command, it's likely that the graphics processor will end up "hanging" or not responding to new commands, making the entire computer system appear to be "stuck."

Having the graphics processor produce bad images or hang the computer system are unacceptable behaviors. The driver software on the CPU and the graphics processor must together guarantee completely correct functionality. Some conventional solutions to these problems are described below.

A first solution is to disable CPU write reordering. This solution requires no graphics processor changes to support, however, this is an unacceptable solution for several reasons. First, on CPUs like the Pentium Pro and Pentium II processors, not using write reordering substantially reduces effective graphics processor performance (on the Pentium Pro, the maximum data throughput to a graphics processor using write reordering can be more than three times faster than when write reordering is disabled). Second, there are CPUs that cannot disable write reordering (e.g., the early "Alpha" processors from Digital Equipment Corp.), rendering this solution useless.

A second solution is to use CPU write reordering but with memory synchronization instructions or techniques. Again, this solution does not require costly graphics processor additions. Both the Intel and the DEC CPUs that perform write reordering include special instructions and methods known as "fences" or "memory barriers" (MBs) that, when used, will cause the CPU to guarantee that all memory writes that are issued before the memory barrier instruction will occur before any memory write issued after the memory barrier instruction. For example, in the following sequence:

write to address A write to address B

MB—memory barrier write to address C write to address D the CPU guarantees that both of addresses A and B will be written before either of addresses C or D (but A could still be written before or after B, and C can be written before or after D). Frequent use of memory barriers solve the above problems by guaranteeing that the CPU issues data to the graphics processor in the correct order. However, invoking memory barriers on both the DEC and Intel CPUs can take a great many CPU cycles to perform, and are thus extremely expensive in terms of performance. Even if the cost of the memory barrier itself were low in terms of CPU cycles, issuing frequent memory barrier instructions interferes with the CPU's write reordering mechanism, which can significantly reduce performance.

A third solution is to use command buffers stored in CPU memory and have the graphics processor process the command buffers directly from CPU memory. Having the graphics processor "pull" the data across the bus instead of having the CPU "push" it across the bus to the graphics processor insures that the graphics processor will receive the data in the correct order. However, this technique has serious drawbacks, including: 1) it requires the graphics processor to implement "bus mastering" logic (the logic that gives the graphics processor the ability to read data from CPU memory) which is expensive both in terms of size and added complexity to the graphics processor design; 2) it only works on bus technology that supports device bus mastering; 3) it does not remove the need for memory barriers when writing to the command buffer in host memory; and 4) performance is reduced due to the increased traffic to the CPU memory system.

A fourth solution is to have the graphics processor sort data words using a temporary, separate sort buffer. While this solution, when used together with the second method, potentially requires fewer memory barriers than the other solutions, it too has serious drawbacks, including: 1) separate sort buffers are expensive to implement in a graphics processor, requiring extra memory and complex logic; 2) the driver must still issue memory barriers after a number of words equal to the size of the sort buffer are written to the graphics processor. The larger the sort buffer, the fewer the memory barriers required, but the graphics processor becomes larger, more complex, and thus more expensive. The smaller the sort buffer, the more frequently the software must perform memory barrier instructions, thereby reducing performance.

What is needed is a system and method for enabling a graphics processor to operate with a CPU that reorders write instructions without requiring expensive hardware and which does not significantly reduce the performance of the CPU.

SUMMARY OF THE INVENTION

The invention is a system and method for enabling a graphics processor to operate with a CPU that reorders write instructions without requiring expensive hardware and which does not significantly reduce the performance of the CPU. The invention allows the graphics processor to evaluate the data sent to it by software running on the CPU in its intended and proper order, even if the CPU transmits the data to the graphics processor in an order different from that generated by the software. The invention works regardless of the particular write reordering technique used by the CPU, and is a very low-cost addition to the graphics processor, requiring only a few registers and a small state machine. The invention identifies the number of "holes" in the reordered write instructions and when the number of holes becomes zero a set of received data is made available for execution by the graphics processor.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

Figure 1:
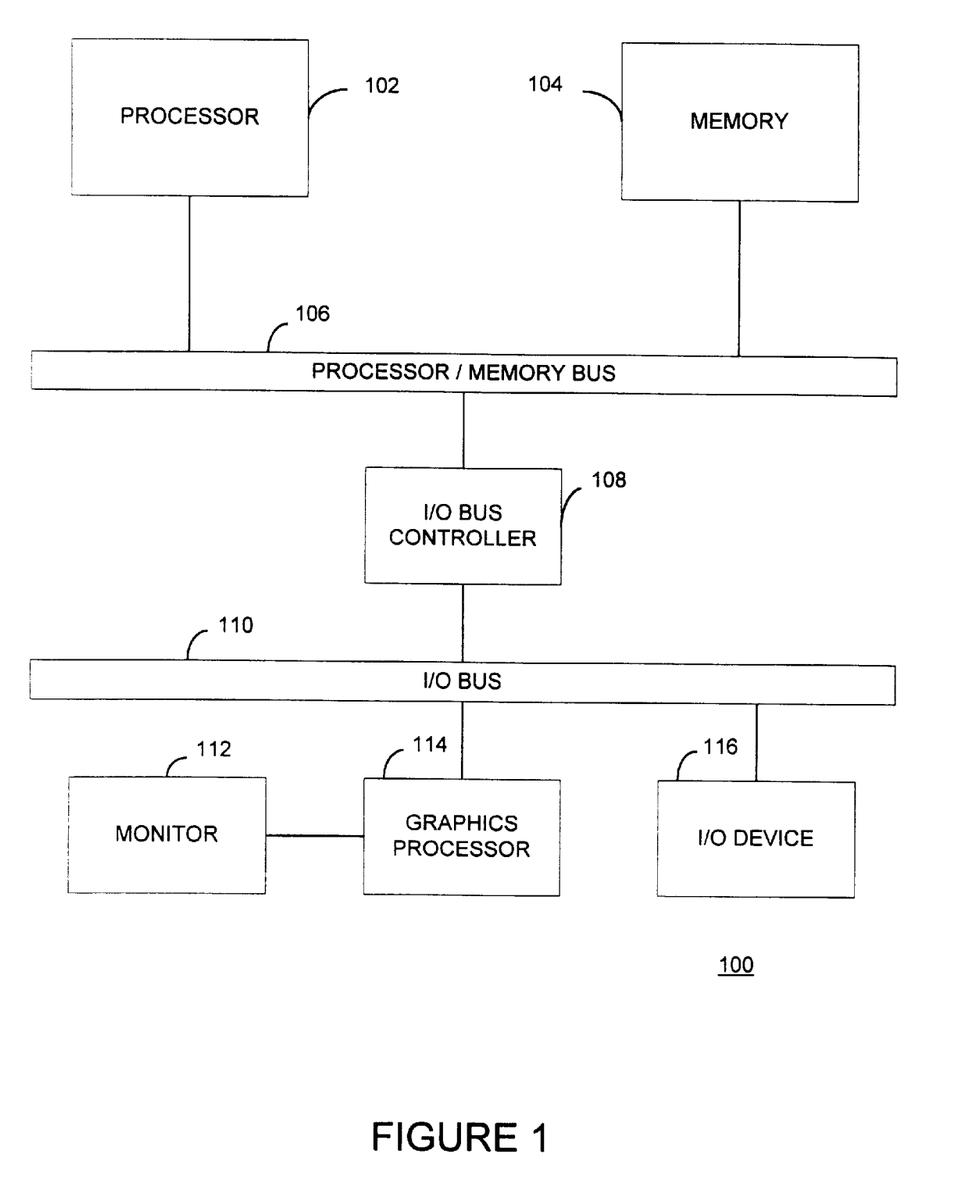
FIG. 1 is an illustration of a computer system in which one embodiment of the present invention operates.

FIG. 1 is an illustration of a computer system 100 in which one embodiment of the present invention operates. In the preferred embodiment, the computer system 100 is a conventional personal computer, e.g., an IBM compatible personal computer having a conventional random access memory (RAM) 104. In an alternate embodiment, the computer system is a video game platform, e.g., a Nintendo game platform, commercially available from Nintendo of America, Inc., Redmond, Wash. In the preferred embodiment, the processor 102 of the computer system 100 is a Pentium II processor, commercially available from INTEL Corporation, Santa Clara, Calif. The processor/memory bus 106 and the input/output (I/O) bus 110 are conventional. A conventional I/O bus controller 108 controls the data flow between the I/O bus 110 and the processor/memory bus 106. Conventional input/output devices 116, e.g., a network adapter, are connected to the I/O bus 110. A conventional computer monitor 112 is driven by the graphics processor 114. The graphics processor 114 is described in greater detail below with reference to FIGS. 2–6.

Figure 2:
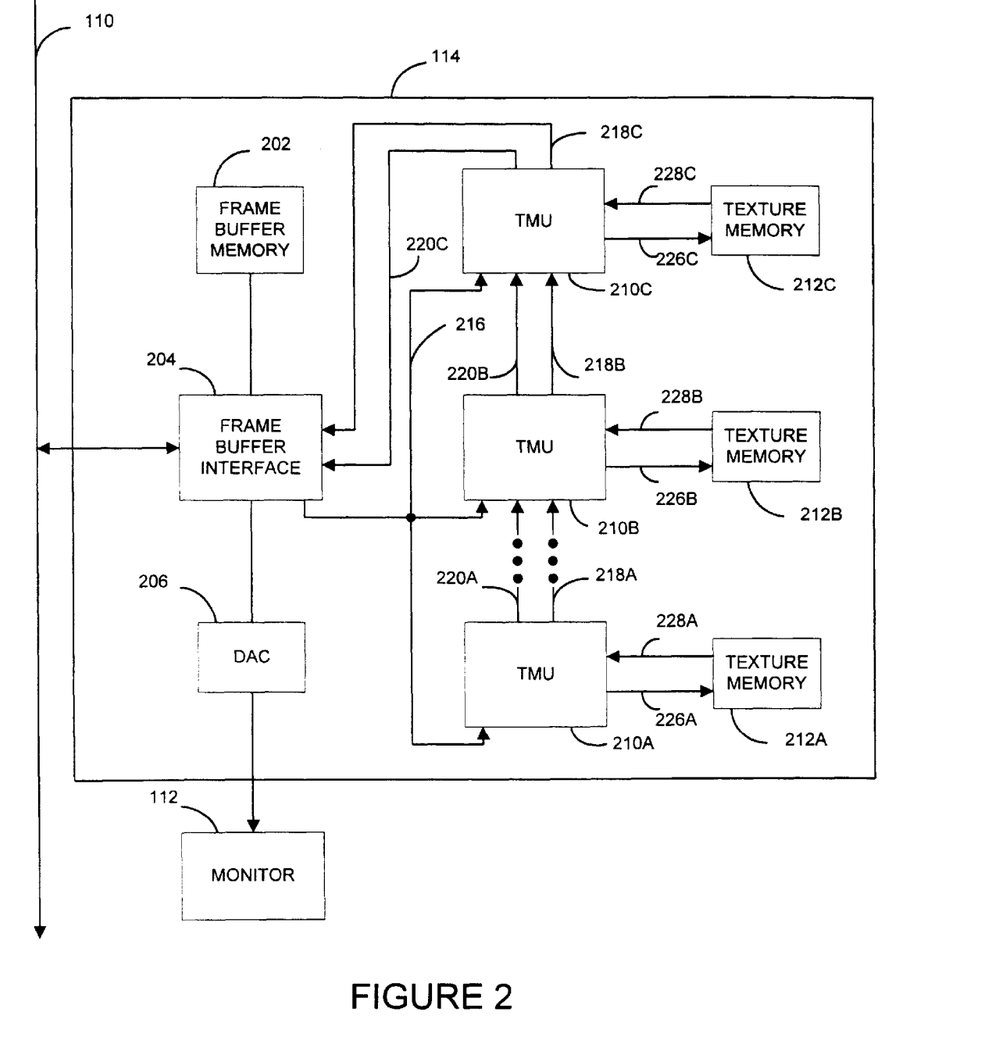
FIG. 2 is an illustration of the graphics processor of one embodiment of the present invention.

FIG. 2 is an illustration of the graphics processor 114 of one embodiment of the present invention. A frame buffer interface (FBI) 204 is coupled to the I/O bus 110. The FBI 204 is also coupled to a frame buffer memory 202, a conventional digital-to-analog converter (DAC) 206, and one or more texture mapping units (TMU) 210. The DAC 206 is also coupled to the monitor 112. Each TMU 210 is also connected to a texture memory 212. The FBI 204 is, preferably, an application specific integrated circuit (ASIC) that serves as an I/O slave device, and all communication from the processor 102 to the graphics processor 114 is performed through the FBI 204. The FBI 204 implements basic three dimensional primitives including Gouraud shading, command buffering, and dithering. The FBI 204 also controls the output to the monitor 112.

Each TMU 210 is also, preferably, an ASIC. The TMU 210 performs composite texture mapping including texture morphing, and texture filtering. Preferably, the frame buffer memory 202 and the texture memory 212 are extended-data-out (EDO) dynamic random access memory (DRAM). The TMU 210 receives a control signal CTRL from the FBI 204 via a control signal line 216. In addition, each TMU 210 receives a local texture signal from its associated texture memory 212. The local texture signal is received via a local texture signal line 228 in response to an address request from the TMU via the address signal line 226. In addition, each TMU 210 receives a texture color/alpha input signal from a previous TMU 210. The texture color/alpha input signal is received via the input/output texture color signal line 218, and the input/output texture alpha signal line 220. Each TMU 210 generates a texture color/alpha output signal. This texture color/alpha output signal is transmitted on another input/output texture color line 218 and another input/output alpha texture color line 220. The texture color value generated by the TMU 210C that is the last in the chain of TMU's 210 is transmitted to the FBI 204.

The operation of the TMU according to an embodiment of the present invention is set forth in U.S. patent application Ser. No. 08/552,740 entitled "Texture Compositing Apparatus and Method", attorney docket number 2199, filed on Nov. 3, 1995, by Gary Tarolli, Scott Sellers, and James E. Margeson, III which is incorporated by reference herein in its entirety, and in U.S. patent application Ser. No. 08/640, 450 entitled "System and Method for Level of Detail Dithering", attorney docket number 2227, filed on Apr. 3, 1996 by Gary Tarolli, Scott Sellers, and James E. Margeson, III which is incorporated by reference herein in its entirety. In one alternate embodiment the entire graphics processor 114 can be located on a single chip, e.g., an application specific integrated circuit (ASIC), alternatively one or more modules of the graphics processor can be located on a single chip, for example, the DAC 206, FBI 204, frame buffer memory 202, and the TMUs 210 can be located on a single chip.

Figure 3:
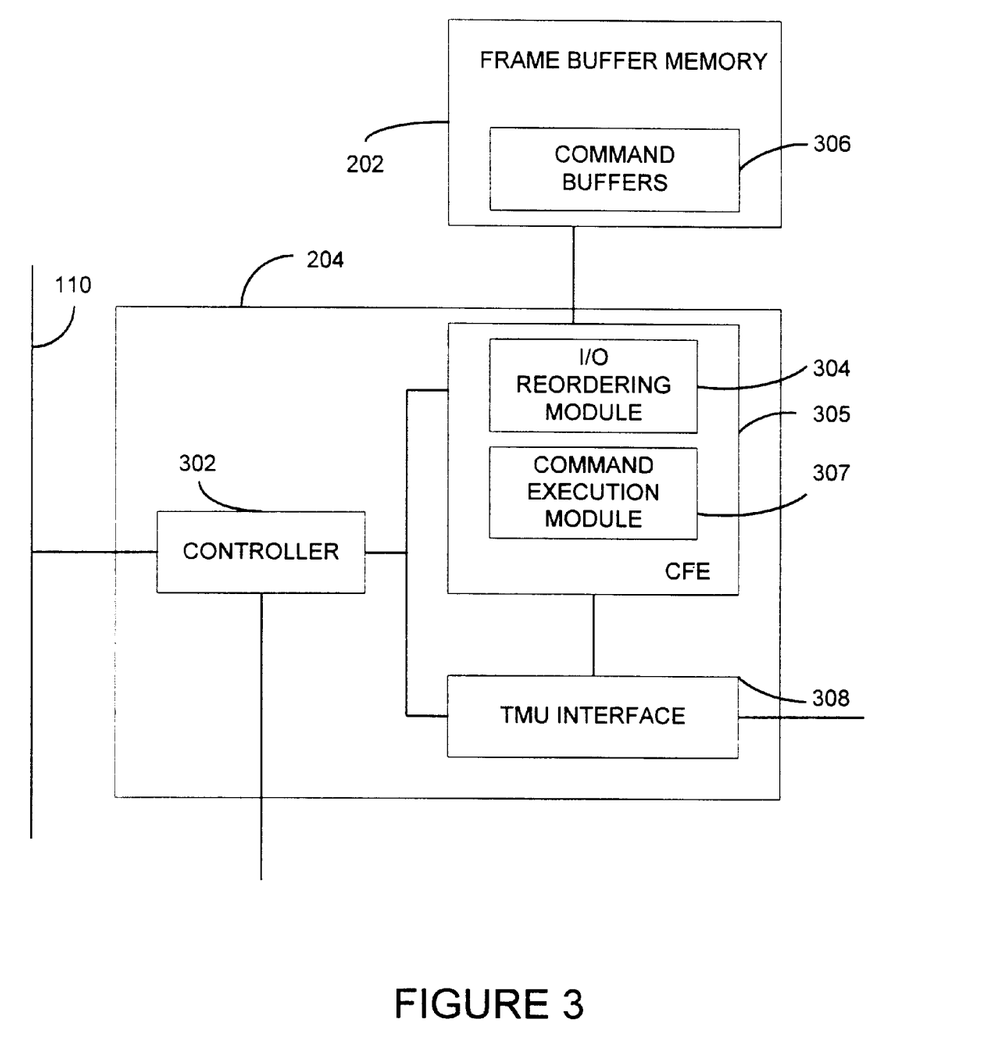
FIG. 3 is a more detailed illustration of a frame buffer interface and frame buffer memory according to one embodiment of the present invention.

FIG. 3 is a more detailed illustration of the frame buffer interface (FBI) 204 and frame buffer memory 202 according to one embodiment of the present invention. The FBI 204 includes a controller 302 for controlling the operation of the FBI 204, a TMU interface 308 that provides an interface between the FBI and the TMU(s) 210, and a command front end module (CFE) 305 having an input/output (I/O) reordering module 304 and a command execution module 307. The frame buffer memory 202 includes one or more command buffers 306. The operation of the command buffers 306, the CFE 305, the I/O reordering module 304 and the command execution module 307 is described in greater detail below. The I/O reordering module 304 detects when the CPU writes non-consecutive addresses to the command buffer 306, and when these gaps (or "holes") between two non-consecutive addresses have been filled, the I/O reordering module 304 signals the number of new consecutive addresses to the command execution module 307. The command execution module 307 then reads these words from the command buffers 306 in frame buffer memory 202, and dispatches them to the appropriate controller within the graphics processor 114, e.g., a TMU 210, and/or the FBI controller 302 (the three-dimensional graphics controller), for execution. Alternate embodiments can include having additional controllers contained in the graphics processor 114, including but not limited to a two-dimensional graphics controller, or a video processing controller. Alternate embodiments can allow multiple, independently active command buffers by including into the CFE 307 one I/O reordering module 304 and one command execution module 307 for each command buffer 306.

The invention solves the problem of high-performance transport from a CPU that performs write reordering, e.g., the Pentium II processor that is commercially available from Intel Corp., Santa Clara, Calif., by allowing the CPU to reorder write instructions and requiring driver software to issue only a single memory barrier (MB) for each number of word writes equal to the size of the graphic processor's command buffer 306. When the graphics processor 114 receives an (address, data) pair, the CFE 305 examines the address to determine whether it falls into one of the active command buffers. If the address is not within the range of the one or more active command buffers 306, the CFE 305 simply writes the data to the given address in frame buffer memory. If the address falls within the range of an active command buffer, the data is written to frame buffer memory 202 at the given address, and the address is input as a CPU write instruction into its corresponding I/O reordering module 304. The I/O reordering module 304 determines whether the new address constitutes a gap or "hole" in its command buffer. The I/O reordering module 304 of the CPE 305 counts the number of holes currently in its command buffer 306, and remembers both the highest address received in the current pass through the buffer ("A-max"), and the address that marks the end of the known hole-free region ("A-min"). The graphics processor 114 is allowed to execute all of the command words from the previously executed command word up through and including the word at address A-min.

One feature of the present invention is that the location of the holes is not important, thus extra, expensive logic and sort buffers are not required. Instead, the graphics processor simply counts the number of holes, and when an address is received ("Address") that is less than A-max and greater than A-min, the graphics processor 114 knows that a hole has been filled, and reduces the number of holes. When all of the holes between A-min and A-max have been filled, all of the words in between A-min and A-max are immediately available for the graphics processor to process, A-min is set to A-max, and the process begins again. When the end of the graphics processor 114 memory buffer is reached, the driver software issues a single memory barrier (MB) instruction to the CPU 102, and continues writing to the graphics processor memory buffer starting at its beginning or base address again (being careful not to write over commands written in the previous trip through the buffer that haven't been processed yet by the graphics processor), and writing commands with increasing addresses. When an address is received that is less than the address A-min, the invention automatically resets the three state machine control registers (A-min, A-max, and the number-of-holes ("holes")) to their initial value. The driver software writes to an address that is less than A-min only when it has reached the end of the memory buffer and begins writing at the top of the buffer again. A description of the operation of driver software with relation to the command buffer is now set forth.

It is possible that some CPUs 102 may implement write reordering in such a manner that the hole count in the I/O reordering module 304 may never reach zero until a memory barrier instruction is executed on the CPU 102. The I/O reordering module 304 only signals the command execution module 307 to dispatch more command words for execution when the hole count reaches zero. Together with such a CPU 102, the graphics processor 114 could remain idle until either the driver software issued its regular, single memory barrier when the driver reached the end of the command buffer 306, or, until other, non-driver software running on the CPU 102 incidentally executed a memory barrier instruction. Allowing the graphics processor 114 to become idle for long periods of time is undesirable as this can drastically reduce the performance of graphics applications. The invention solves this problem in the following manner: if the hole count in the I/O reordering module 304 remains greater than zero for a certain amount of time (which may be programmable), the CFE 305 causes the graphics processor 114 to signal the CPU 102 to fill all current holes. An example of such a signaling mechanism, as implemented in one embodiment of the current invention, is to raise an interrupt to the CPU 102. The driver software running on the CPU 102 responds to this interrupt by issuing a memory barrier instruction, thus filling all current holes. It is envisioned that other triggering events can cause the graphics processor 114 to signal the CPU 102, for example, if the difference between A-max and A-min exceeds a threshold value (which may be programmable). It is envisioned that signaling mechanisms other than CPU interrupts may cause all holes to be filled, either with or without the assistance of driver software. When all holes in the command buffer 306 are filled, the hole count becomes zero, thereby allowing the graphics processor to continue executing command words. The command execution module 307 maintains a "read pointer" which represents the address in the associated command buffer 306 that was most recently read by the graphics processor 114. This address marks the boundary in the command buffer 306 between words that have been read and dispatched to a controller and words that have not yet been read or dispatched. When depth-inc is added to the command execution module's 307 command depth counter 408, the read pointer advances, causing the command execution module 307 to read words from the command buffer 306 and to dispatch them to the appropriate controller, e.g., the FBI controller 302 or the TMU interface 308. In order to ensure the integrity of the data and/or commands that have been written to the command buffer 306 but not yet processed by the graphics processor 114, the driver software does not write to addresses past the address stored in the read pointer. The driver software writes command/data words to successive command buffer addresses, beginning at the first address of the command buffer (B) and continuing towards the last address of the command buffer (B+N−1, where N is the size in words of the command buffer 306). In one embodiment of the current invention, the driver determines that the addresses used in commands are approaching the end of the command buffer. The driver software notifies the graphics processor 114 that address B+W is the last valid command address, where B+W is some address in the command buffer 306, and then begins writing new commands beginning back at the first address of the command buffer (B). This process of marking the last valid address in the command buffer 306 and resetting the new command addresses to continue from the beginning address of the command buffer (B) is called "wrapping" the command buffer 306.

There are at least two ways that this wrapping can be accomplished. In the first method, the driver issues a "jump" command into the command buffer that contains a command buffer address that, when executed by the command execution module 307, directly changes the read pointer's value. In one embodiment of the present invention, the address sent in the jump command will always be that of the beginning of the command buffer, B. Subsequent writes to "depth-inc" cause the command execution module 307 to read commands from frame buffer addresses starting from the beginning of the command buffer (B). In the second method, the CFE 305 could automatically reset the command read pointer to the beginning of the command buffer (B) after it reads the last word of the command buffer (B+N−1).

Using the present invention, the graphics processor processes the correct command/data words in the buffer in order, regardless of the order that the CPU sent them. Because only one memory barrier is required per number of words in the command buffer, and this buffer can use any amount of available graphics processor memory (e.g., the memory buffer could be 64K words in size), this single memory barrier instruction comes at essentially no cost to performance. The graphics processor 114 processes command words in the memory buffer as soon as they are determined to be properly received, without any additional prompting from the driver software on the CPU. Only three additional words of memory are required to be stored on the graphics processor: A-min, A-max, and the hole count (holes).

The command execution module 307 receives the depth increment (depth-inc) values from the I/O reordering module (as described below) and adds this value to its command depth count. When the command depth count is greater than zero the command execution module 307 reads a number of words—the number of words equal to or less than the number of words available as represented by the value of the command depth count—from the command buffer 306 in the frame buffer memory 202, decrements the command depth count by the number of words read, and dispatches the word(s) to the appropriate controller based upon the header in the command word. Examples of controllers include the TMUs 210, a two-dimensional renderer, a three dimensional renderer, and a video processor, for example. In alternate embodiments, the command execution module 307 waits for multiple words to become available before sending them to the controllers with, possibly, a time-out function to permit less than the determined number of words to be sent.

Figure 4:
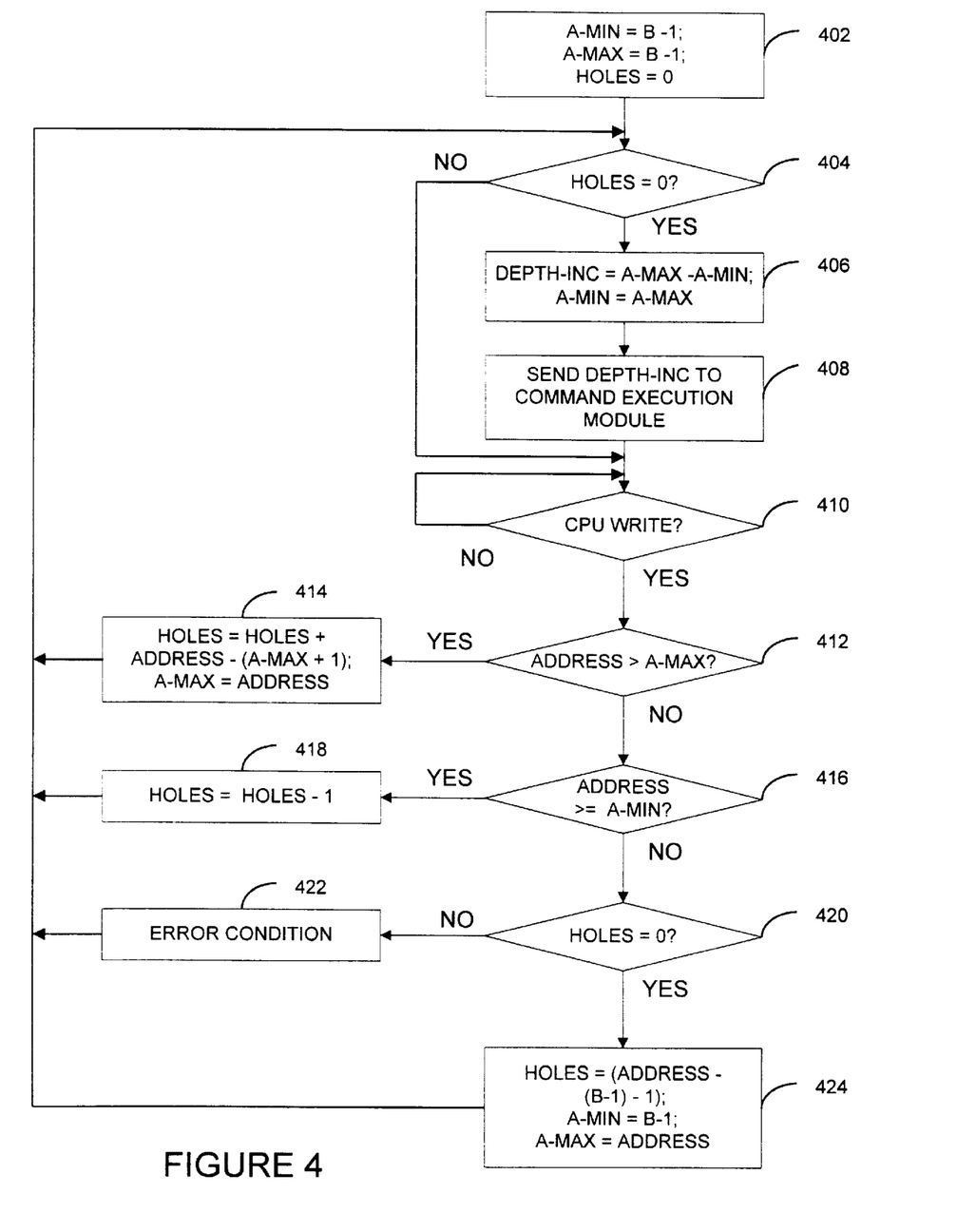
FIG. 4 is a flow chart illustrating the operation of the I/O reordering module according to one embodiment of the present invention.
Figure 5:
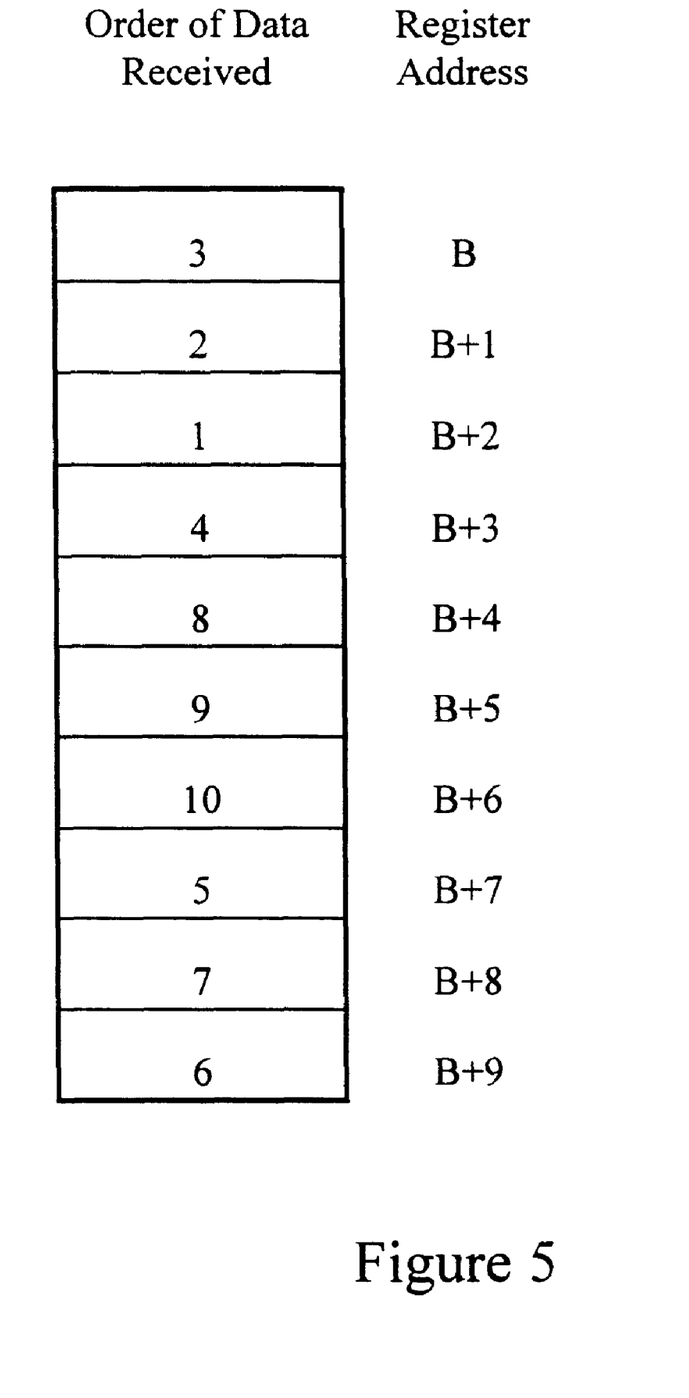
FIG. 5 is an illustration of a portion of the frame buffer and identifies the order in which the data is received by the buffer where B represents the base address of the buffer according to the present invention.
Figure 6:
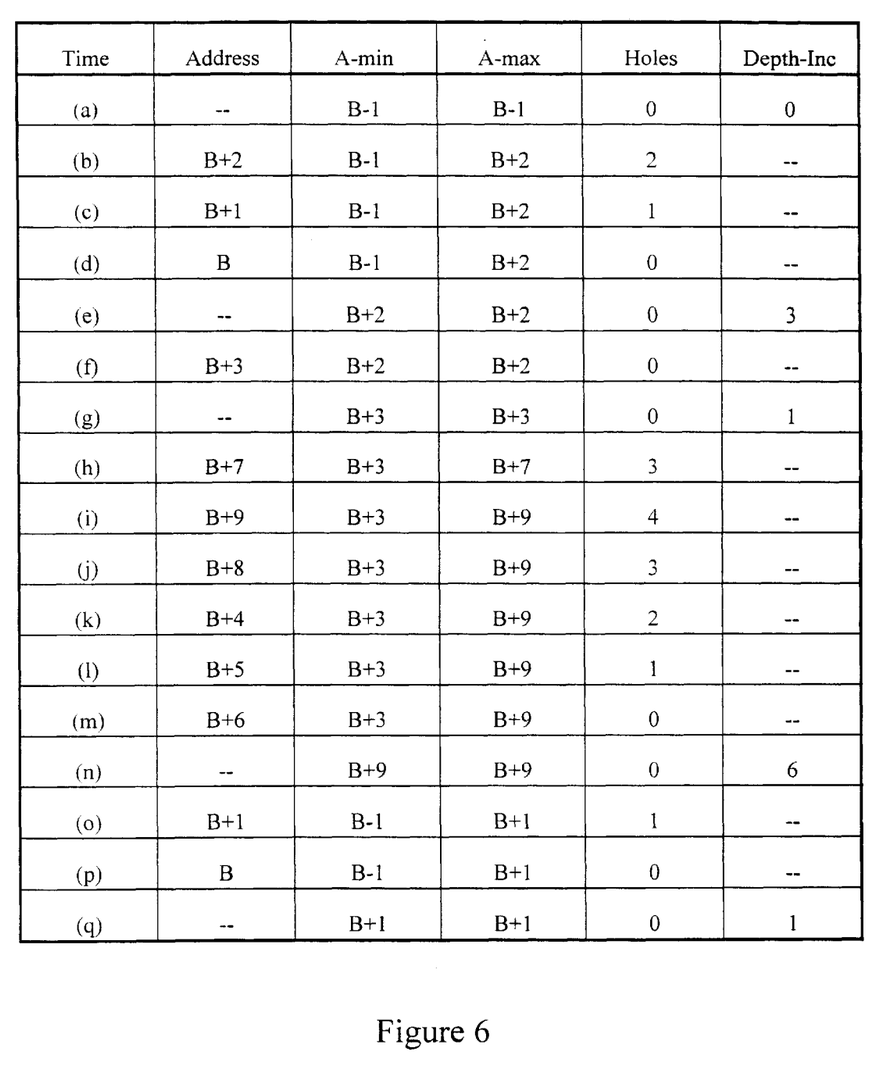
FIG. 6 is a table illustrating an example of the values of some variables used by the I/O reordering module.

The operation of the I/O reordering module will be described with respect to FIGS. 4–6. FIG. 4 is a flow chart illustrating the operation of the I/O reordering module 304 according to the preferred embodiment of the present invention. FIG. 5 is an illustration of a portion of the frame buffer 202 (or other memory buffer) and identifies the order in which the data is received by the buffer where B represents the base address of the buffer. FIG. 6 is a table illustrating an example of the values of some variables used by the I/O reordering module 304.

The I/O reordering module 304 begins by initializing 402 the values for A-min, A-max, and holes. In the preferred embodiment the values for A-min and A-max are set to a value that is one less than the command buffer base address (B) and the value for holes is set to zero. The I/O reordering module 304 determines 404 if the number of holes is equal to zero. If not, the operation proceeds to step 410. Otherwise, the I/O reordering module 304 sets 406 the value for the depth increment (depth-inc) equal to the difference between A-max and A-min and then the I/O reordering module 304 sets A-min equal to A-max. In the current example, Depth-inc is set equal to zero. The values of the variables at this time are shown in FIG. 6 with reference to time (a).

The I/O reordering module 304 waits 410 until a write instruction is received. In the current example, the first data that is received by the I/O reordering module 304 has an address that corresponds to the buffer address B+2 as illustrated in FIG. 5. The I/O reordering module 304 determines 412 if the address is greater than A-max. In the current example, the value of address is B+2 and the value for A-max is B−1, therefore the I/O reordering module 304 sets 414 the value of holes equal to the sum of the current value of holes (0) and the difference between the value of address and the value of (A-max−1). In this example, the value of holes is two as shown in equation (1).

$$\text{holes} = 0 + (B+2) - (B) = 2 \qquad \text{Eq. (1)}$$

The values of the variables at this time are shown in FIG. 6 with reference to time (b). The I/O reordering module 304 determines 404 that the value of holes is not equal to zero and the I/O reordering module 304 waits 410 for another CPU write. The second data that is received corresponds to address B+1 in the buffer as shown in FIG. 5. The I/O reordering module 304 determines 412 that the address (B+1) is not greater than A-max (B+2). The I/O reordering module 304 then determines 416 that the address (B+1) is greater than or equal to A-min (B−1) and decrements 418 the value of holes by one. The value of holes is now equal to one. As described above, the variable "holes" represents the number of data locations between the addresses A-min and A-max that have not yet been received. The values of the variables at this time are shown in FIG. 6 with reference to time (c).

The I/O reordering module 304 determines 404 that the value of holes is not equal to zero and the I/O reordering module 304 waits 410 for another CPU write. The third data that is received in this example corresponds to the buffer address B, as shown in FIG. 5. The I/O reordering module 304 determines 412 that the address (e) is not greater than A-max (B+2). The I/O reordering module 304 then determines 416 that the address (B) is greater than or equal to A-min (B−1) and decrements 418 the value of holes by one. The value of holes is now equal to zero. This represents that there are no holes, i.e., missing data, between the addresses A-min and A-max. The values of the variables at this time are shown in FIG. 6 with reference to time (d). The I/O reordering module 304 determines 404 that the number of holes is equal to zero and sets 406 depth-inc equal to the difference between A-max and A-min. In the current example depth-inc is equal to 3 as shown in equation (2).

$$\text{Depth-inc} = A\text{-max} - A\text{-min} = (B+2) - (B-1) = 3 \quad \text{Eq. (2)}$$

The I/O reordering module 304 then sets 406 A-min equal to A-max and sends 408 the value of the Depth-inc to the command execution module 307 which identifies the number of additional words in the command buffer 306 that can be read and executed. The values of the variables at this time are shown in FIG. 6 with reference to time (e).

The I/O reordering module 304 then waits 410 for another CPU write. The next data received in this example corresponds to buffer address B+3 as indicated by the number "4" in FIG. 5. The I/O reordering module 304 determines 412 that the address is greater than A-max and sets 414 the value of holes equal to zero ((B+3)−(B+2+1)) and sets A-max equal to B+3. The values of the variables at this time are shown in FIG. (6) with reference to time (f). The I/O reordering module 304 determines 404 that the number of holes is zero and sets 406 Depth-inc equal to one ((B+3)−(B+2)) and sets A-min equal to (B+3). The I/O reordering module 304 then sends 408 the value of the depth-inc to the command execution module 307. The values of the variables at this time are shown in FIG. (6) with reference to time (g).

The I/O reordering module 304 then waits 410 for another CPU write. The next data received in this example corresponds to buffer address B+7 as indicated by the number "5" in FIG. 5. The I/O reordering module 304 determines 412 that the address is greater than A-max and sets 414 the value of holes equal to three (0+(B+7)−(B+3+1)), and sets A-max equal to B+7. The values of the variables at this time are shown in FIG. (6) with reference to time (h). The I/O reordering module 304 determines 404 that the number of holes is not equal to zero and waits 410 for another CPU write. The next data received corresponds to buffer address B+9 as indicated by the number "6" in FIG. 6. The I/O reordering module 304 determines 412 that the address is greater than A-max and sets 414 the value of holes equal to four (3+(B+9)−(B+7+1)), and sets A-max equal to B+9. The values of the variables at this time are shown in FIG. (6) with reference to time (i). The I/O reordering module 304 determines 404 that the number of holes is not equal to zero and waits 410 for another CPU write.

The next data received corresponds to buffer address B+8 as indicated by the number 711 in FIG. 6. The I/O reordering module 304 determines 412 that the address (B+8) is not greater than A-max (B+9) and determines 416 that the address (B+8) is greater than or equal to A-min (B+3). The I/O reordering module 304 then reduces the value of holes by one (3). The values of the variables at this time are shown in FIG. (6) with reference to time (j). The I/O reordering module 304 determines 404 that the number of holes is not equal to zero and waits 410 for another CPU write.

The next data received corresponds to buffer address B+4 as indicated by the number "8" in FIG. 6. The I/O reordering module 304 determines 412 that the address (B+4) is not greater than A-max (B+9) and determines 416 that the address (B+4) is greater than or equal to A-min (B+3). The I/O reordering module 304 then reduces the value of holes by one (2). The values of the variables at this time are shown in FIG. (6) with reference to time (k). The I/O reordering module 304 determines 404 that the number of holes is not equal to zero and waits 410 for another CPU write.

The next data received corresponds to buffer address B+5 as indicated by the number "9" in FIG. 6. The I/O reordering module 304 determines 412 that the address (B+5) is not greater than A-max (B+9) and determines 416 that the address (B+5) is greater than or equal to A-min (B+3). The I/O reordering module 304 then reduces the value of holes by one (1). The values of the variables at this time are shown in FIG. (6) with reference to time (1). The I/O reordering module 304 determines 404 that the number of holes is not equal to zero and waits 410 for another CPU write.

The next data received corresponds to buffer address B+6 as indicated by the number "10" in FIG. 6. The I/O reordering module 304 determines 412 that the address (B+6) is not greater than A-max (B+9) and determines 416 that the address (B+6) is greater than or equal to A-min (B+3). The I/O reordering module 304 then reduces the value of holes by one (0). The values of the variables at this time are shown in FIG. (6) with reference to time (m). The I/O reordering module 304 determines 404 that the number of holes is equal to zero and sets 406 depth-inc equal to six ((B+9)−(B+3)), and sets A-min equal to B+9. The I/O reordering module 304 then sends 408 the value of depth-inc to the command execution module 307. The values of the variables at this time are shown in FIG. (6) with reference to time (n).

In order to facilitate this example, the command buffer 306 size is a little over ten data-words in length. The present invention will operate with command buffers 306 of various sizes, e.g., 65536 bytes. When the received data reaches or approaches the bottom of the command buffer 306, the driver on the CPU performs a command buffer "wrap" as described earlier, and executes a single memory barrier instruction. As described above, a memory barrier causes all CPU writes issued before the memory barrier to complete before any write issued after the memory barrier. In the present example, the driver wraps the command buffer after issuing the write to command buffer 306 address B+9, issues a memory barrier, and then begins writing again starting at command buffer 306 base address B. Thus, all of the memory writes issued before the wrap are guaranteed to be received (filling all holes) before any write issued after the wrap.

In the current example, the next CPU memory write corresponds to address B+1 as indicated in FIG. 6. The I/O reordering module 304 determines 412 that the address (B+1) is not greater than A-max (B+9). The I/O reordering module 304 then determines 416 that the address (B+1) is less than A-min (B+9). The I/O reordering module 304 determines 420 that the number of holes is zero—the system would be in an error condition 422 otherwise—and resets 424 the variables. The I/O reordering module 304 sets holes equal to one ((B+1)−(B−1)−1), sets A-min equal to B−1 and sets A-max equal to B+1. The values of the variables at this time are shown in FIG. (6) with reference to time (o). The I/O reordering module 304 determines 404 that the number of holes is not equal to zero and waits 410 for another CPU write.

The next data received corresponds to buffer address B. The I/O reordering module 304 determines 412 that the address (B) is not greater than A-max (B+1) and determines 416 that the address (B) is greater than or equal to A-min (B−1). The I/O reordering module 304 then reduces the value of holes by one (0). The values of the variables at this time are shown in FIG. (6) with reference to time (p). The I/O reordering module 304 determines 404 that the number of holes is equal to zero and sets 406 depth-inc equal to one ((B+1)−(B)), and sets A-min equal to B+1. The I/O reordering module 304 then sends 408 the value of depth-inc to the command execution module 307. The values of the variables at this time are shown in FIG. (6) with reference to time (q).

In alternate embodiments the buffer can be located in off-chip RAM or on-chip memory registers. It covers the in-order evaluation of data words that may be sent out-of-order, whether they make up commands or data.

While the invention has been particularly shown and described with reference to a preferred embodiment, it will be understood by persons skilled in the relevant art that various change in form and details can be made therein without departing from the spirit and scope of the invention. For example, words from the command buffer could be processed in decreasing address order instead of increasing address order.

What is claimed is:

1. A computer based method for operation on a computer having a memory buffer, a graphics processor, and a processor capable of reordering write operations of data and for ensuring the graphics processor receives the data sequentially, comprising the steps of:

(a) initializing a minimum address and a maximum address to an address larger than the address to be received by the write operation;

(b) initializing a holes value to an initialization value;

(c) receiving a signal representing a received address and received data, said received data to be written to the memory buffer at said received address;

(d) setting said holes value equal to the holes value plus the received address minus said maximum address minus one if said address is greater than said maximum address;

(e) setting said holes value equal to the holes value minus one if said address is greater than or equal to said minimum address;

(f) transmitting a signal indicating that all data having an address that is less than the maximum address has been received if said holes value is equal to initialization value; and (g) repeating steps (c)–(f);

wherein said holes value is dependent upon only the number of addresses between the minimum address and the maximum address that have not been received.

2. The method of claim 1, wherein step (f) comprises the steps of setting a depth value equal to the difference between the maximum address and the minimum address and setting said minimum address equal to said maximum address if said holes value is equal to initialization value; and transmitting said depth value indicating that a sequential block of data has been received, a number of addresses in said sequential block of data equal to said depth value if said holes value is equal to initialization value.

3. The method of claim 2, further comprising the step of: invoking a barrier command to ensure that all data having an address that is less than said maximum address are received before any data having an address that is greater than said maximum address.

4. The method of claim 3, wherein said barrier command is invoked when the received address exceeds a third address in the buffer memory.

5. The method of claim 4, wherein said third address is an address near the end of said memory buffer.

6. The method of claim 3, wherein said barrier command is invoked when a difference between the maximum address and the minimum address exceeds a first threshold.

7. The method of claim 6, wherein said threshold is programmable.

8. The method of claim 3, wherein said barrier command is invoked when the holes value remains greater than said initialization value for a first time period.

9. The method of claim 8, wherein said first time period is programmable.

10. The method of claim 3, further comprising the steps, to be performed before step (f), of:

setting said holes value equal to the received address minus a base address of the memory buffer minus two if said address is not greater than said maximum address and said address is not greater than or equal to said minimum address;

setting said minimum address equal to the base address minus 1 if said address is not greater than said maximum address and said address is not greater than or equal to said minimum address; and setting said maximum address equal to said received address if said address is not greater than said maximum address and said address is not greater than or equal to said minimum address.

11. The method of claim 2, further comprising the steps, to be performed before step (f), of:

setting said holes value equal to the received address minus a base address of the memory buffer minus two if said address is not greater than said maximum address and said address is not greater than or equal to said minimum address;

setting said minimum address equal to the base address minus 1 if said address is not greater than said maximum address and said address is not greater than or equal to said minimum address; and setting said maximum address equal to said received address if said address is not greater than said maximum address and said address is not greater than or equal to said minimum address.

12. The method of claim 1, further comprising the steps, to be performed before step (f), of:

setting said holes value equal to the received address minus a base address of the memory buffer minus two if said address is not greater than said maximum address and said address is not greater than or equal to said minimum address;

setting said minimum address equal to the base address minus 1 if said address is not greater than said maximum address and said address is not greater than or equal to said minimum address; and setting said maximum address equal to said received address if said address is not greater than said maximum address and said address is not greater than or equal to said minimum address.

13. A computer based system for ensuring a graphics processor receives data sequentially including:

a memory buffer;

a graphics processor, disposed to receive signals from said memory buffer;

a processor capable of reordering write operations of data to said memory buffer; and a controller, disposed to receive signals from said memory buffer, having first initialization means for initializing a minimum address and a maximum address to an address larger than the address to be received by the write operation, second initialization means for initializing a holes value to an initialization value, first receiving means for receiving a signal representing a received address and a received data, said received data to be written to said memory buffer at said received address, holes determination means for setting said holes value equal to the holes value plus the received address minus said maximum address minus one if said address is greater than said maximum address, and for setting said holes value equal to the holes value minus one if said address is greater than or equal to said minimum address, wherein said holes value is dependent upon only the number of addresses between the minimum address and the maximum address that have not been received by said first receiving means, and data release means for transmitting a signal indicating that all data having an address that is less than the maximum address has been received if said holes value is equal to initialization value.

14. The system of claim 13, wherein said data release means includes:

depth value means for setting a depth value equal to the difference between the maximum address and the minimum address and setting said minimum address equal to said maximum address if said holes value is equal to initialization value; and sequential block means for transmitting said depth value indicating that a sequential block of data has been received, a number of addresses in said sequential block of data equal to said depth value if said holes value is equal to initialization value.

15. The system of claim 14 wherein control means invokes a barrier command to ensure that all data having an address that is less than said maximum address are received before any data having an address that is greater than said maximum address.

16. The system of claim 15, wherein said barrier command is invoked when the received address exceeds a third address in the buffer memory.

17. The system of claim 16, wherein said third address is an address near the end of said memory buffer.

18. The system of claim 15, wherein said barrier command is invoked when the a difference between the maximum address and the minimum address exceeds a first threshold.

19. The system of claim 18, wherein said threshold is programmable.

20. The system of claim 15, wherein said barrier command is invoked when the holes value remains greater than said initialization value for a first time period.

21. The system of claim 20, wherein said first time period is programmable.

22. The system of claim 14, wherein:

said holes determination means sets said holes value equal to the received address minus a base address of the memory buffer minus two if said address is not greater than said maximum address and said address is not greater than or equal to said minimum address; and said controller sets said minimum address equal to the base address minus 1 if said address is not greater than said maximum address and said address is not greater than or equal to said minimum address, and sets said maximum address equal to said received address if said address is not greater than said maximum address and said address is not greater than or equal to said minimum address.

23. The system of claim 22 wherein control means invokes a barrier command to ensure that all data having an addresses that is less than said maximum address are received before any data having an address that is greater than said maximum address.

24. The system of claim 23, wherein said barrier command is invoked when the received address exceeds a third address in the buffer memory.

25. The system of claim 24, wherein said third address is an address near the end of said memory buffer.

26. The system of claim 23, wherein said barrier command is invoked when a difference between the maximum address and the minimum address exceeds a first threshold.

27. The system of claim 26, wherein said threshold is programmable.

28. The system of claim 23, wherein said barrier command is invoked when the holes value remains greater than said initialization value for a first time period.

29. The system of claim 28, wherein said first time period is programmable.

30. The system of claim 13, wherein:

said holes determination means sets said holes value equal to the received address minus a base address of the memory buffer minus two if said address is not greater than said maximum address and said address is not greater than or equal to said minimum address; and said controller sets said minimum address equal to the base address minus 1 if said address is not greater than said maximum address and said address is not greater than or equal to said minimum address, and sets said maximum address equal to said received address if said address is not greater than said maximum address and said address is not greater than or equal to said minimum address.

31. The system of claim 30 wherein control means invokes a barrier command to ensure that all data having an addresses that is less than said maximum address are received before any data having an address that is greater than said maximum address.

32. The system of claim 31, wherein said barrier command is invoked when the received address exceeds a third address in the buffer memory.

33. The system of claim 32, wherein said third address is an address near the end of said memory buffer.

34. The system of claim 31, wherein said barrier command is invoked when a difference between the maximum address and the minimum address exceeds a first threshold.

35. The system of claim 34, wherein said threshold is programmable.

36. The system of claim 31, wherein said barrier command is invoked when the holes value remains greater than said initialization value for a first time period.

37. The system of claim 36, wherein said first time period is programmable.

* * * * *